US012798771B2

(12) United States Patent
Yang et al.

(10) Patent No.: US 12,798,771 B2
(45) Date of Patent: Nov. 17, 2026

(54) TRAY FOR PASSENGER SEAT WITH DISPLAY

(71) Applicant: Gentex Corporation, Zeeland, MI (US)

(72) Inventors: Yuhang Yang, Comstock Park, MI (US); Michael Burns, Hudsonville, MI (US); Bethany VanOeffelen, Holland, MI (US); Thomas S. Wright, Holland, MI (US); Andrew D. Weller, Holland, MI (US); David I. Driscoll, Caledonia, MI (US); Kurtis L. Geerlings, Zeeland, MI (US); Xiaoxu Niu, Holland, MI (US); Bradley R. Hamlin, Allendale, MI (US); Michael F. Behm, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 96 days.

(21) Appl. No.: 18/886,534

(22) Filed: Sep. 16, 2024

(65) Prior Publication Data

US 2025/0100685 A1 Mar. 27, 2025

Related U.S. Application Data

(60) Provisional application No. 63/540,287, filed on Sep. 25, 2023.

(51) Int. Cl.
*B64D 11/00* (2006.01)
*B64D 11/04* (2006.01)
(Continued)

(52) U.S. Cl.
CPC .. *B64D 11/00153* (2014.12); *B64D 11/00155* (2014.12); *B64D 11/0638* (2014.12); *G06F 3/044* (2013.01)

(58) Field of Classification Search
CPC .......... B64D 11/00153; B64D 11/0638; B60R 11/0235; G06F 3/044
See application file for complete search history.

(56) References Cited

U.S. PATENT DOCUMENTS 5,311,302 A * 5/1994 Berry ................. B64D 11/0015 348/E7.086
8,934,063 B2 * 1/2015 Boyer, Jr. .............. H04N 5/655 725/77
(Continued)

FOREIGN PATENT DOCUMENTS

CN 111712783 A * 9/2020 ............. G06F 3/044
CN 113060289 A * 7/2021 ......... B64D 11/0605
(Continued)

*Primary Examiner* — Timothy J Brindley
(74) *Attorney, Agent, or Firm* — PRICE HENEVELD LLP

(57) ABSTRACT

A tray for a seat of a passenger vehicle including: (a) a first article that is at least partially transparent to a wavelength or wavelength range within the visible spectrum of electromagnetic radiation comprising a first primary surface; and (b) a first display separated from an external environment by the first article, the first display, when activated, at least partially visible through the first article from the external environment. A seat of a passenger vehicle including a seatback and the tray coupled to the seatback. The tray can be manipulable to, from, and between a stowed position and a deployed position. The first display is activated when the tray is in the deployed position. The tray can include a second display that is activated when the tray is in the stowed position to be viewable by a passenger rearward of the seatback to which the tray is coupled.

20 Claims, 10 Drawing Sheets

(51) Int. Cl.

| | |
|---|---|
| ***B64D 11/06*** | (2006.01) |
| *G06F 3/044* | (2006.01) |

(56) References Cited

U.S. PATENT DOCUMENTS

| | | | | |
|---|---|---|---|---|
| 9,469,400 | B1 * | 10/2016 | Irmen | B64D 11/00152 |
| 9,958,956 | B2 * | 5/2018 | Jiang | G06F 3/0446 |
| 10,326,299 | B2 * | 6/2019 | Jouper | B64D 11/00152 |
| 11,383,840 | B2 * | 7/2022 | Kremer | B64D 11/0015 |
| 11,702,206 | B2 * | 7/2023 | Soo | B64D 11/00151<br>345/204 |
| 11,904,812 | B2 * | 2/2024 | Gianakopoulos | B60R 11/0252 |
| 12,296,962 | B2 * | 5/2025 | Pence | B64D 11/0638 |
| 12,312,086 | B2 * | 5/2025 | Ruiz Lara | B64D 11/00155 |
| 2002/0066393 | A1 * | 6/2002 | Strode | B64D 11/0638<br>108/50.11 |
| 2017/0024062 | A1 * | 1/2017 | Jiang | G06F 3/045 |
| 2017/0071375 | A1 * | 3/2017 | Smith | B64D 11/0638 |
| 2019/0368027 | A1 * | 12/2019 | Oono | C23C 14/02 |
| 2023/0059294 | A1 * | 2/2023 | Chak | B64D 11/00151 |
| 2024/0409221 | A1 * | 12/2024 | Zachäus | B64D 11/00152 |
| 2025/0062641 | A1 * | 2/2025 | Stanton | B64D 11/0638 |
| 2026/0015085 | A1 * | 1/2026 | Setele | B64D 11/0624 |
| 2026/0084819 | A1 * | 3/2026 | Gable | B64D 11/00151 |

FOREIGN PATENT DOCUMENTS

| | | | | | |
|---|---|---|---|---|---|
| DE | 10118496 | A1 | * | 10/2002 | B60K 35/53 |
| FR | 2716062 | A1 | * | 8/1995 | B64D 11/0015 |
| WO | WO-2019156846 | A1 | * | 8/2019 | B60N 3/004 |
| WO | WO-2026039216 | A1 | * | 2/2026 | B60N 3/004 |

* cited by examiner

TRAY FOR PASSENGER SEAT WITH DISPLAY

CROSS-REFERENCE TO RELATED APPLICATION

This application claims priority to and the benefit under 35 U.S.C. § 119(e) of U.S. Provisional Application No. 63/540,287, filed on 25 Sep. 2023, entitled TRAY FOR PASSENGER SEAT WITH DISPLAY, the disclosure of which is hereby incorporated herein by reference in its entirety.

FIELD OF THE DISCLOSURE

The present disclosure generally relates to a tray with one or more displays, and more particularly to such a tray coupled to a passenger seat (e.g., an airline seat) for passenger use.

BACKGROUND

An airliner transports passengers from one location to another. The airliner includes airline seats to accommodate the passengers. The airline seats are typically arranged in rows, with the passenger occupying one airline seat facing the seatback of another airline seat. The airline seats sometimes include electronics, such as personal video screens, integrated into the seatback. In addition, the airline seats sometimes include a tray for eating or reading that is integrated into the seatback as well.

However, there is a problem in that the personal video screens are difficult to repair and replace, because of the integration into the seatback, sometimes requiring removal of fabric on the seatback.

SUMMARY OF THE DISCLOSURE

The present disclosure addresses that problem with a tray with one or more displays disposed therein that the passenger can view, both while the tray is in a stowed position and while the tray is in a deployed position. The tray is coupled to the seatback but not integrated therein. Thus, the tray with the one or more displays can be repaired or replaced without having to disassemble the airline seat or remove and replace fabric.

According to one aspect of the present disclosure, a tray for a passenger seat comprises: (a) a first article that is at least partially transparent to a wavelength or wavelength range within the visible spectrum of electromagnetic radiation comprising a first primary surface; and (b) a first display separated from an external environment by the first article, the first display, when activated, at least partially visible through the first article from the external environment.

According to another aspect of the present disclosure, a seat of a passenger vehicle comprises: (a) a seatback; and (b) a tray coupled to the seatback, the tray comprising: (i) a first article that is at least partially transparent to a wavelength or wavelength range within the visible spectrum of electromagnetic radiation comprising a first primary surface; and (ii) a first display separated from an external environment by the first article, the first display, when activated, at least partially visible through the first article from the external environment.

According to yet another aspect of the present disclosure, a method of using a tray of a seat comprises: in a passenger vehicle, causing a display of a tray, in a stowed position, coupled to a seatback of a seat to display a seat number of a seat rearward of the seatback to which the tray is coupled.

These and other features, advantages, and objects of the present disclosure will be further understood and appreciated by those skilled in the art by reference to the following specification, claims, and appended drawings.

DETAILED DESCRIPTION

Figure 1:
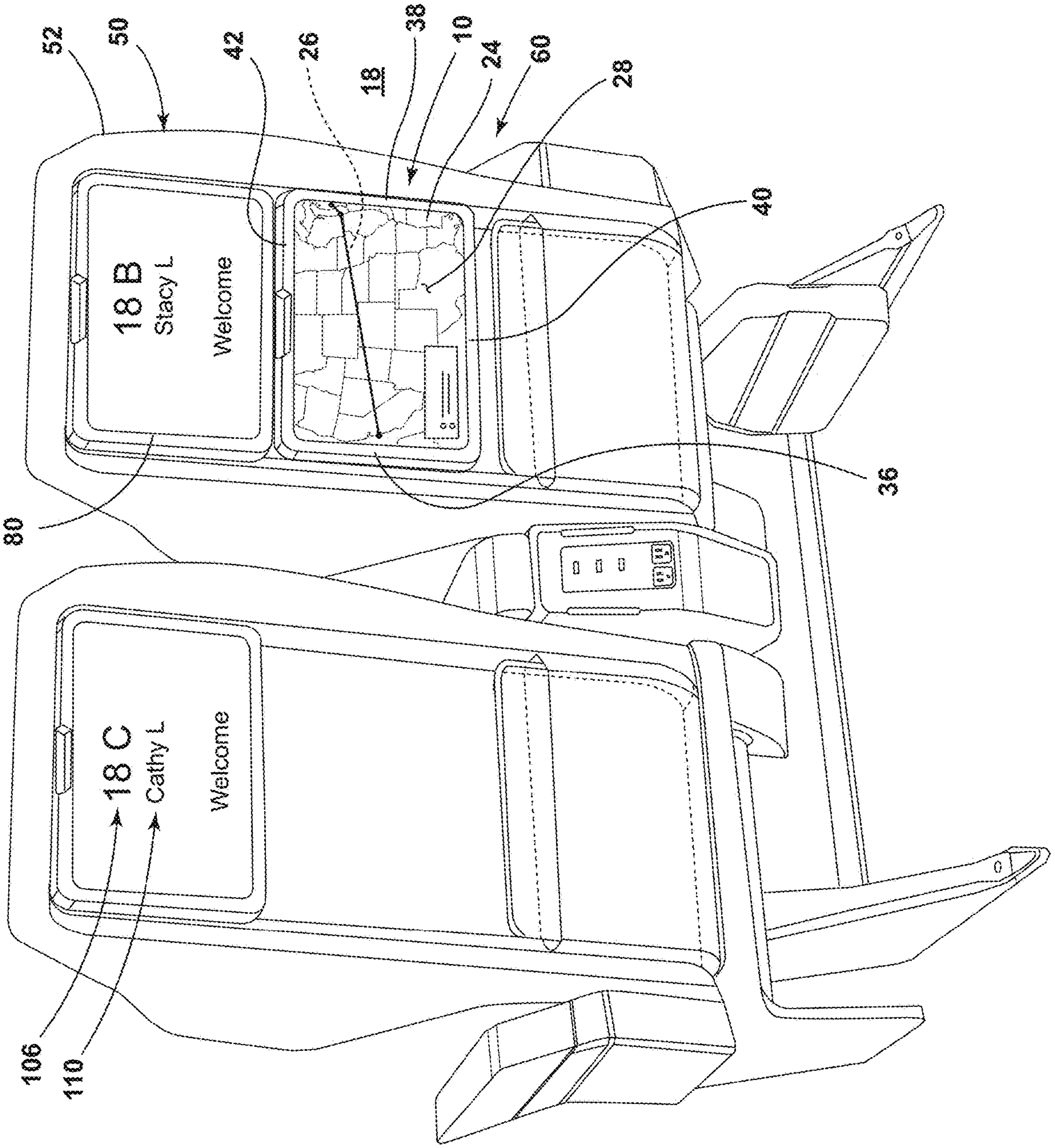
FIG. 1 is a rear perspective view of an airline seat with a tray of the present disclosure, illustrating the tray including a second display (the first display will be introduced momentarily) that a passenger in an airline seat rearward of the tray can view while the tray is in an upright position.

The present illustrated embodiments reside primarily in combinations of method steps and apparatus components related to a tray with a display. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface of the device closest to an intended viewer, and the term "rear" shall refer to a surface of the device furthest from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
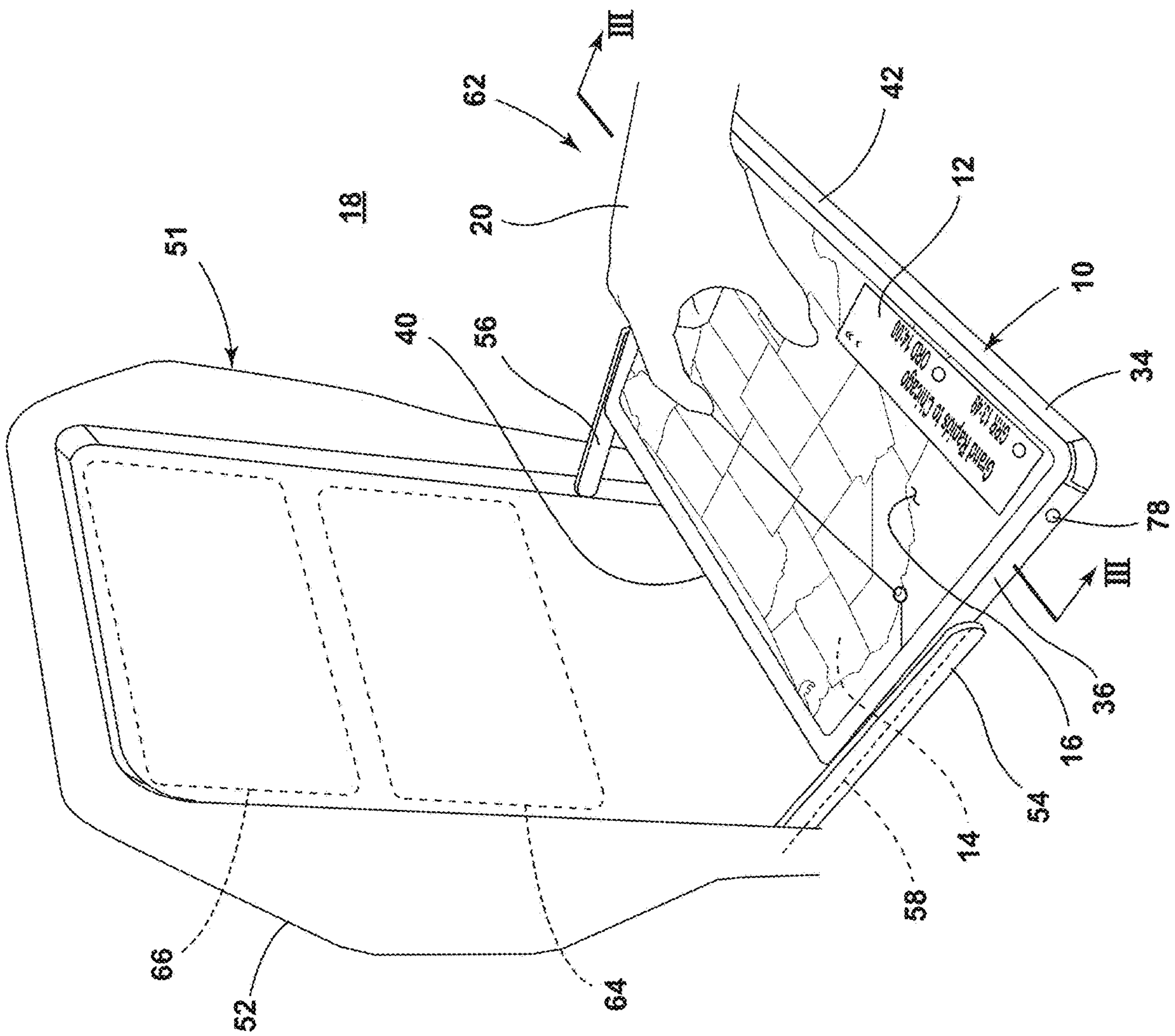
FIG. 2 is an above rear perspective view of the airline seat and tray of FIG. 1, illustrating the tray including a first display that the passenger can view while the tray is in a deployed position.
Figure 3:
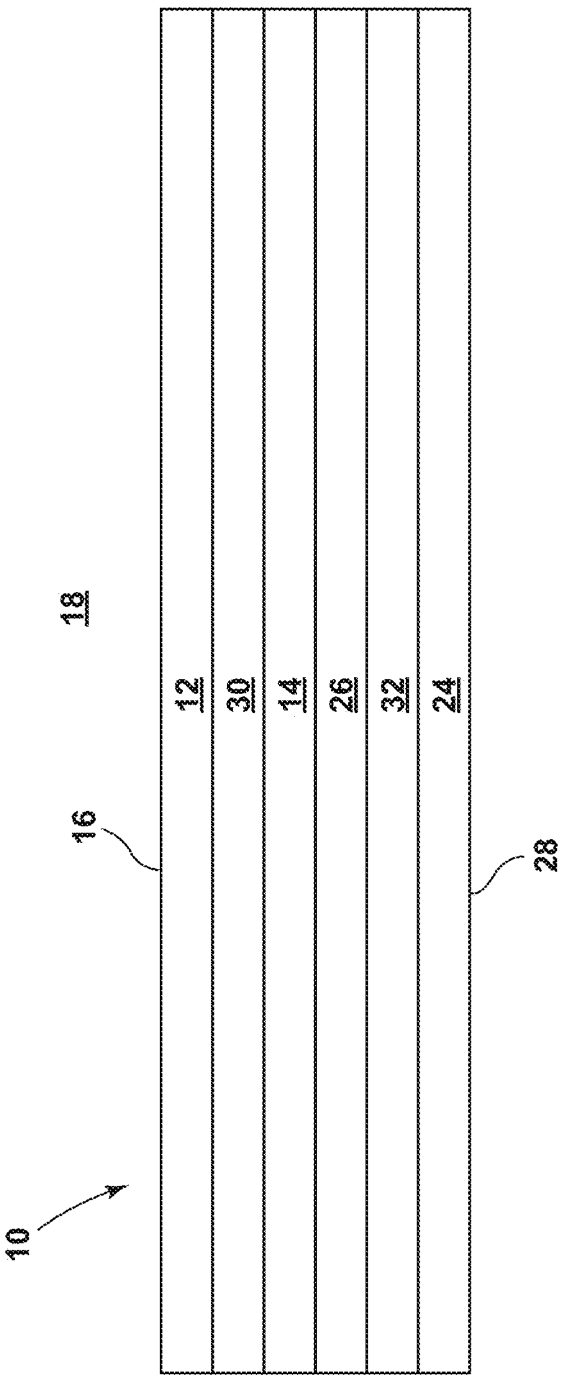
FIG. 3 is an elevation view of a cross-section of the tray taken through line III-III of FIG. 2, illustrating the tray including a first article with a first primary surface facing the external environment, a first capacitive touchscreen conductive layer disposed below the first article, a first display disposed below the first capacitive touchscreen conductive layer, a second display disposed below the first display, a second capacitive touchscreen conductive layer disposed below the second display, and a second article disposed below the second capacitive touchscreen conductive layer with a first primary surface also facing the external environment.

Referring to FIGS. 1-3, a tray 10 includes a first article 12 and a first display 14. The first article 12 is at least partially transparent to a wavelength or wavelength range within the visible spectrum of electromagnetic radiation. In some embodiments, the first article 12 is substantially transparent to the wavelength or wavelength range. At least partial transparency means 5% or more transmittance of the wavelength or wavelength range. Substantial transparency for purposes of this disclosure means greater than or equal to 50% transmittance of the wavelength or wavelength range. Example wavelengths include any wavelength within the wavelength range of from 380 nm to 750 nm. In embodiments, the first article 12 transmits 5%, 10%, 20%, 30%, 40%, 50%, 60%, 70%, 80%, 90%, 95% or more of the wavelength or wavelength range, or within any range bound by any two of those values (e.g., from 20% to 80%, from 30% to 50%, and so on). The first article 12 can have a composition of glass or plastic. The first article 12 has a first primary surface 16 facing an external environment 18. The first primary surface 16 can be exposed to the external environment 18, such as capable of being touched by a hand 20 of a passenger 22.

The first display 14 is separated from the external environment 18 by the first article 12. The first display 14 is an electronic visual display. The first display 14 can be a liquid-crystal display (LCD) or a light-emitting diode (LED) display, among other options. The first display 14 may include various layers not specifically illustrated or described herein. The first display 14, when activated, is at least partially visible through the first article 12 from the external environment 18.

In embodiments, the tray 10 further includes a second article 24 and a second display 26. The first article 12 and the second article 24 sandwich the first display 14 and the second display 26. The first display 14 is disposed closer to the first article 12 than the second article 24. The second display 26 is disposed closer to the second article 24 than the first article 12.

The second article 24 is at least partially transparent to a wavelength or wavelength range within the visible spectrum of electromagnetic radiation. In some embodiments, the second article 24 is substantially transparent to the wavelength or wavelength range. Example wavelengths include any wavelength within the wavelength range of from 380 nm to 750 nm. In embodiments, the second article 24 transmits 5%, 10%, 20%, 30%, 40%, 50%, 60%, 70%, 80%, 90%, 95% or more of the wavelength or wavelength range, or within any range bound by any two of those values (e.g., from 20% to 80%, from 30% to 50%, and so on). The second article 24 can have a composition of glass or plastic. The second article 24 has a first primary surface 28 facing the external environment 18, but the first primary surfaces 16, 28 of the first article 12 and the second article 24 face in opposite directions. The first primary surface 28 can be exposed to the external environment 18, such as capable of being touched by a hand 20.

The second display 26 is separated from the external environment 18 by the second article 24. The second display 26 is an electronic visual display. The second display 26 can be a liquid-crystal display (LCD) or a light-emitting diode (LED) display, among other options. The second display 26 may include various layers not specifically illustrated or described herein. The second display 26, when activated, is at least partially visible through the second article 24 from the external environment 18.

In embodiments, the tray 10 further includes a first capacitive touchscreen conductive layer 30. The first capacitive touchscreen conductive layer 30 is disposed between the first display 14 and the first article 12. The tray 10 can include one or more substrates (e.g., insulative substrates) between first capacitive touchscreen conductive layer 30 and the first display 14. The first capacitive touchscreen conductive layer 30 can be patterned as known in the touchscreen art (e.g., Manhattan pattern, the Diamond pattern, the Flooded pattern, and so on). The first capacitive touchscreen conductive layer 30 can be made of any suitable material known in the touchscreen art. Example materials include a transparent conductive oxide (TCO), such as indium tin oxide (ITO), fluorine doped tin oxide (FTO), tin doped ITO, doped zinc oxide (e.g., Al:ZnO, Ga:ZnO, B:ZnO), indium zinc oxide, fluorine doped tin oxide, and antimony doped tin oxide, among others. This list is not meant to be exhaustive.

In embodiments, the tray 10 further includes a second capacitive touchscreen conductive layer 32. The second capacitive touchscreen conductive layer 32 is disposed between the second display 26 and the second article 24. The tray 10 can include one or more substrates (e.g., insulative substrates) between second capacitive touchscreen conductive layer 32 and the second display 26. The second capacitive touchscreen conductive layer 32 can be patterned as known in the touchscreen art, as described above. The second capacitive touchscreen conductive layer 32 can be made of any suitable material known in the touchscreen art, as described above. As will be further discussed, the first capacitive touchscreen conductive layer 30 and the second capacitive touchscreen conductive layer 32 provide the tray 10 with touchscreen capabilities, allowing the hand 20 of the passenger 22 to manipulate output of the first display 14 and the second display 26, respectively, as known in the touch-screen art.

In embodiments, the tray 10 has a perimeter 34 that is substantially square or rectangular with a first edge 36, a second edge 38, a third edge 40, and a fourth edge 42. The first edge 36 and the second edge 38 face in opposite directions. The third edge 40 and the fourth edge 42 face in opposite directions. The third edge 40 and the fourth edge 42 are generally orthogonal to the first edge 36 and the second edge 38.

In embodiments, the first article 12 and the first display 14 terminate proximate the first edge 36 and the second edge 38, and also terminate proximate the third edge 40 and the fourth edge 42. In such embodiments, the first display 14 can display output coterminous with the perimeter 34 of the tray 10. The display output thus can be substantially the entirety of one side of the tray 10.

Figure 4:
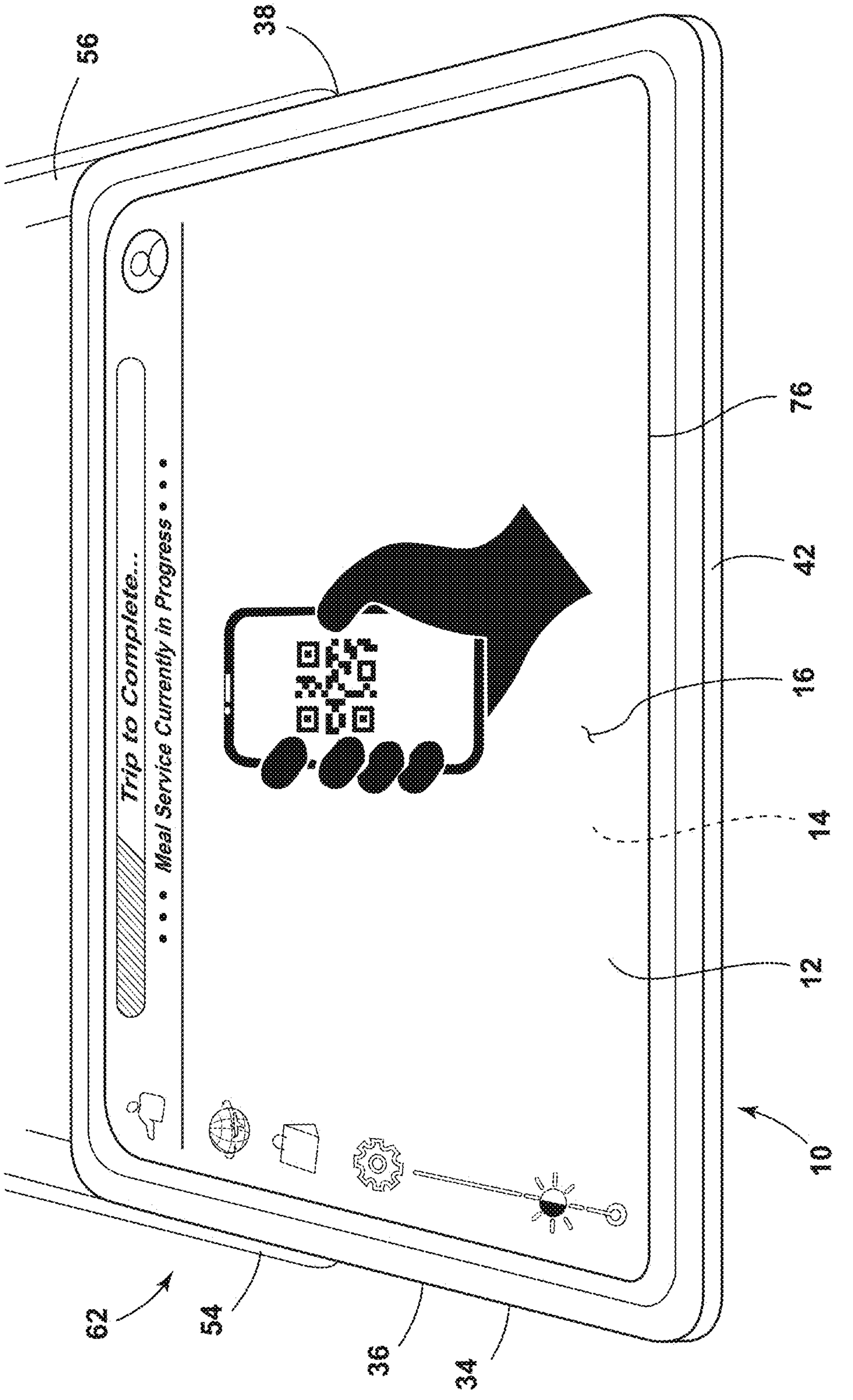
FIG. 4 is a rear perspective view of the tray of FIG. 1 in the deployed position and coupled to the airline seat with a first arm bracket and a second arm bracket.

Referring now additionally to FIG. 4, in embodiments, the first article 12 includes a recess 44. The recess 44 is open to the external environment 18 and extends toward the first display 14. The recess 44 can be circular, such as to receive a bottom of a cup 46.

In embodiments, instead of a recess 44, the tray 10 includes an aperture (not separately illustrated). The aperture, if included, is within the perimeter 34 of the tray 10 and can extend through the first article 12, the first display 14, the second display 26, and the second article 24. The aperture can be sized and shaped to accept and secure the bottom of the cup 46 when the tray is in a deployed position 62 (see FIG. 2)

Figure 5:
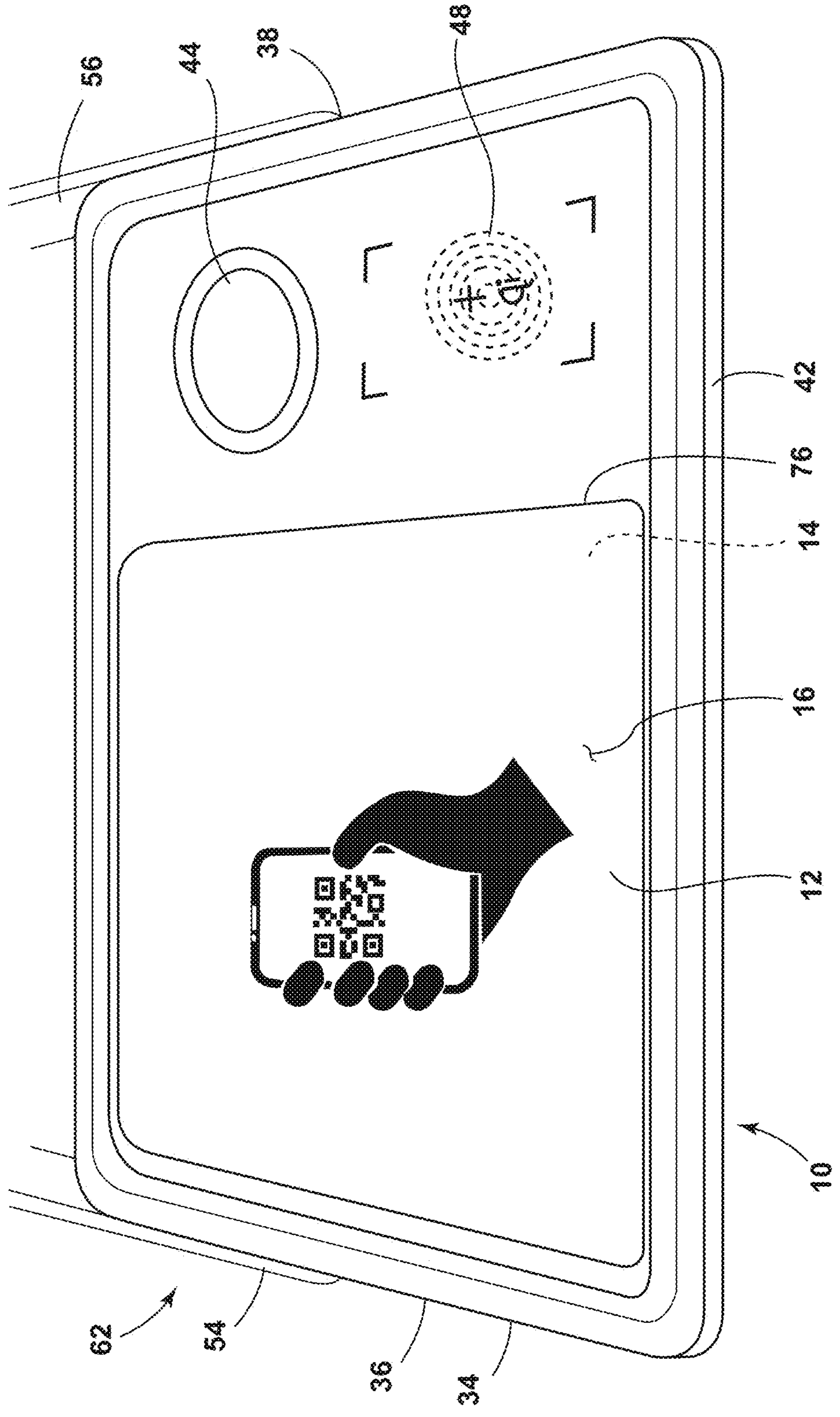
FIG. 5 is a similar view as FIG. 4 but illustrating the tray further including an inductive coil to charge an electronic device of the passenger.

Referring additionally to FIG. 5, in embodiments, the tray 10 further includes an inductive coil 48. The inductive coil 48 is disposed on the other side of first display 14 as the first article 12, such as between the first display 14 and the second display 26. The inductive coil 48 is configured to charge an electronic device (e.g., a smart phone) of the passenger 22 disposed upon or above the first primary surface 16 of the first article 12.

Referring back again to FIGS. 1 and 2, the tray 10 can be coupled to a seat 50 of a passenger vehicle 104, such as a seatback 52 of the seat 50. To facilitate the coupling, in embodiments, the tray 10 or the seat 50 includes a first arm bracket 54 and a second arm bracket 56. The first arm bracket 54 and the second arm bracket 56 are each coupled to both the seatback 52 and the tray 10. The first article 12, the first display 14, the second display 26, and the second article 24 are disposed between the first arm bracket 54 and the second arm bracket 56. The first arm bracket 54 and the second arm bracket 56 are configured to couple the tray 10 to the seat 50. For example, each of the first arm bracket 54 and the second arm bracket 56 can be pivotably coupled to both the tray 10 (such as at the first edge 36 and the second edge 38, respectively) and the seatback 52. Each of the first arm bracket 54 and the second arm bracket 56 can include a track assembly (not separately illustrated) to permit the tray 10 to be manipulated closer to or further from the passenger 22 as in FIG. 2, or elevationally along the seatback 52 as in FIG. 1.

In embodiments, the tray 10 further includes one or more electrical wires 58 (see FIG. 2). The one or more electrical wires 58 are in connection with the first display 14, the second display 26, the first capacitive touchscreen conductive layer 30, and the second capacitive touchscreen conductive layer 32. The one or more electrical wires 58 can extend from the seatback 52 or the seat 50 generally, along or through at least one of the first arm bracket 54 and the second arm bracket 56 to the seat 50, and into the tray 10, such as to the first display 14 and the second display 26. The one or more electrical wires 58 can be in the form of a wire harness.

The tray 10, when coupled to the seat 50, can be manipulated to, from, and between (i) a stowed position 60 (see FIG. 1) and a deployed position 62 (see, e.g., FIG. 2). In the stowed position 60, the first primary surface 16 of the first article 12 faces the seatback 52. In the stowed position 60, the tray 10 can be substantially flush with the seatback 52. For example, the first article 12 can be substantially flush with the seatback 52 or the first primary surface 28 of the second article 24 can be flush with the seatback 52. In the deployed position 62, the first primary surface 16 of the first article 12 is substantially horizontal. The first arm bracket 54 and the second arm bracket 56 being pivotably coupled to the seatback 52 allow the tray 10 to be moved between the stowed position 60 and the deployed position 62.

In the stowed position 60, the second display 26 is visible through the second article 24. A passenger 22 in an airline seat rearward of the airline seat to which tray 10 is coupled can then view the second display 26. As mentioned, while in the stowed position 60, the tray 10 is positionable elevationally from a lower position 64 (see FIG. 2) to a higher position 66 along the seatback 52. For example, the track system can be temporarily locked in place at the higher position 66. The passenger 22 can thus view the second display 26 at different eye levels.

In the deployed position 62, as described, the first display 14 is visible through the first article 12. The passenger 22 in the airline seat can then view the first display 14 from above the first display 14.

Figure 6:
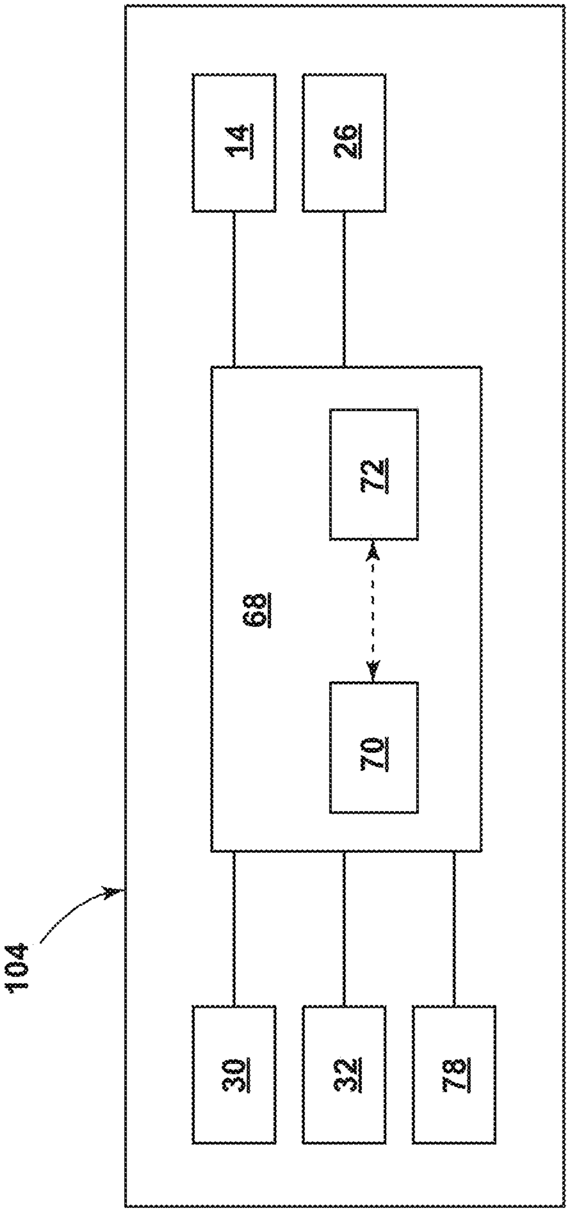
FIG. 6 is a schematic view of an airliner within which the airline seat is disposed, illustrating a controller controlling the first display and the second display, in embodiments, as a function of output from the first capacitive touch screen conductive layer and the second capacitive touch screen conductive layer, which changes upon touch from the passenger and the presence of an object upon the first article.

In embodiments, referring now to FIG. 6, a controller 68 is in communication with the first capacitive touchscreen conductive layer 30 and the first display 14. The controller 68 can additionally be in communication with the second capacitive touchscreen conductive layer 32 and the second display 26. The controller 68 thus can control what is the first display 14 and the second display 26 display to the passenger 22. Further, the controller 68 can, through communication with the first capacitive touchscreen conductive layer 30 and the second capacitive touchscreen conductive layer 32, allow the passenger 22 to command what the first display 14 and the second display 26 display to the passenger 22. The controller 68 can include memory 70 and a processor 72. The memory 70 can include application programs that the processor 72 executes to achieve the functions of the tray 10 described herein.

Figure 7:
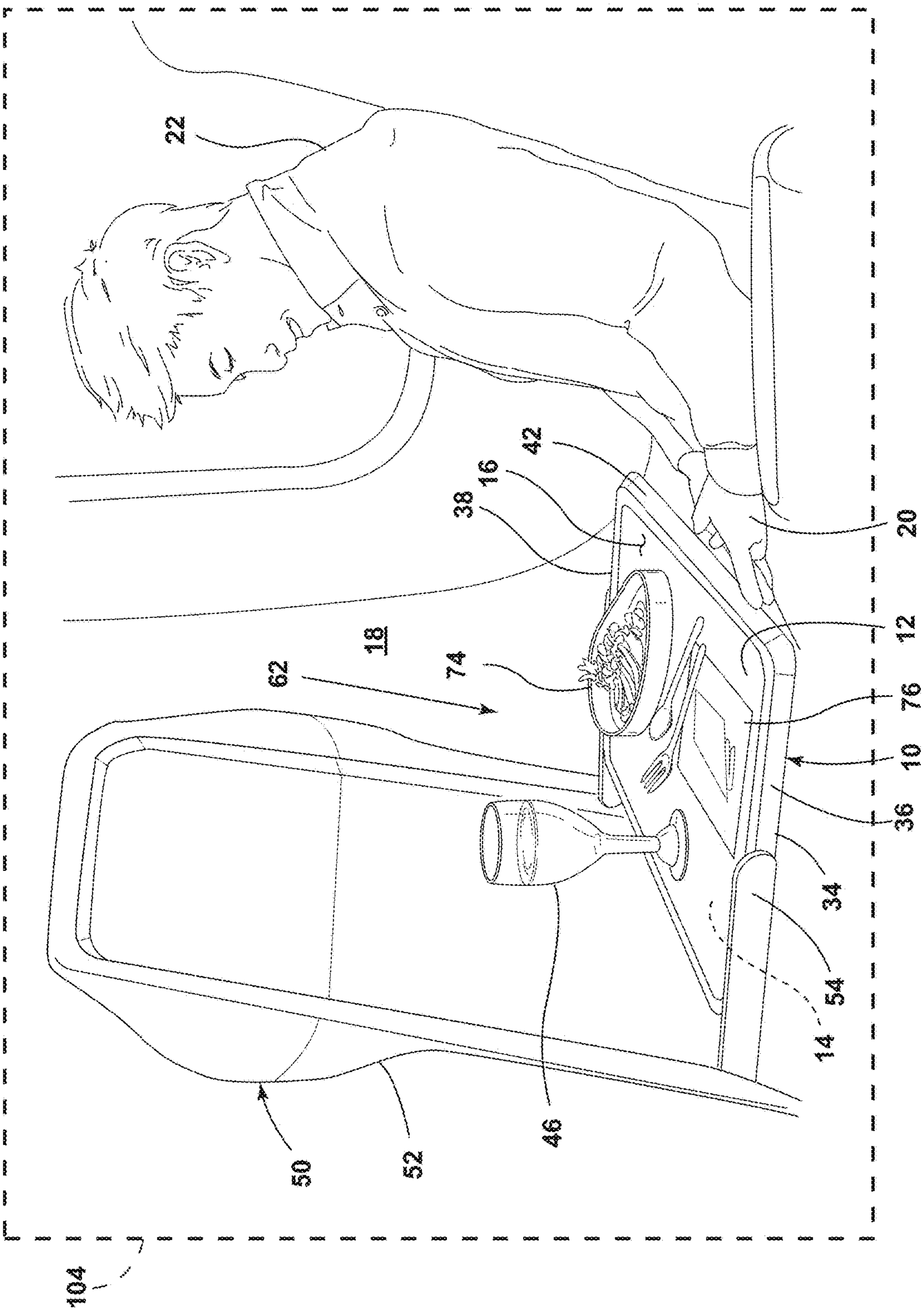
FIG. 7 is a side perspective view of the passenger viewing the first display transmitted through the first article while the tray is supporting the object (dinnerware) and the display area of the first display has been reduced so that the object does not occlude the passenger's view.

Referring now to FIG. 7, in embodiments, the controller 68 is configured to cause the first display 14 to display only where an object 74 is not detected to be upon the first article 12. For example, using output from the first capacitive touchscreen conductive layer 30, the controller 68 can determine the presence and the location of the object 74 upon the first article 12. The controller 68 can then limit a display area 76 of the first display 14 to only where the object 74 is not detected to be upon the first article 12. For example, if the controller 68 concludes that there is no object 74 upon the first article 12, then the controller 68 can cause the first display 14 to display whatever content to largest display area 76 possible of the first display 14 (see, e.g., FIG. 4). However, if the controller 68 determines that the object 74 (e.g., the food service items at FIG. 7) is upon the first article 12, the controller 68 can cause the first display 14 to narrow the display area 76 to only the uncovered portion of the first article 12. That way, the passenger 22 can use the tray 10 both to hold the object 74 and still to view the output of the first display 14.

In embodiments, the tray 10 further includes a sensor 78. The sensor 78 is in communication with the controller 68. The sensor 78 is configured to generate output from which the controller 68 can determine whether the tray 10 is in the stowed position 60 or not in the stowed position 60 (e.g., in the deployed position 62). Suitable examples of the sensor 78 include a magnetic sensor, an accelerometer, a switch, a light sensor, among others. That list is not meant to be exhaustive. The controller 68 can deactivate the first display 14 and activate the second display 26 when the controller 68 determines, as a function of a signal received from the sensor 78, that the tray is in the stowed position 60 or not in the deployed position 62. The controller 68 can activate the first display 14 and deactivate the second display 26 when the controller 68 determines, as a function of a signal received from the sensor 78, that the tray is in the deployed position 62 or not in the stowed position 60.

Figure 8:
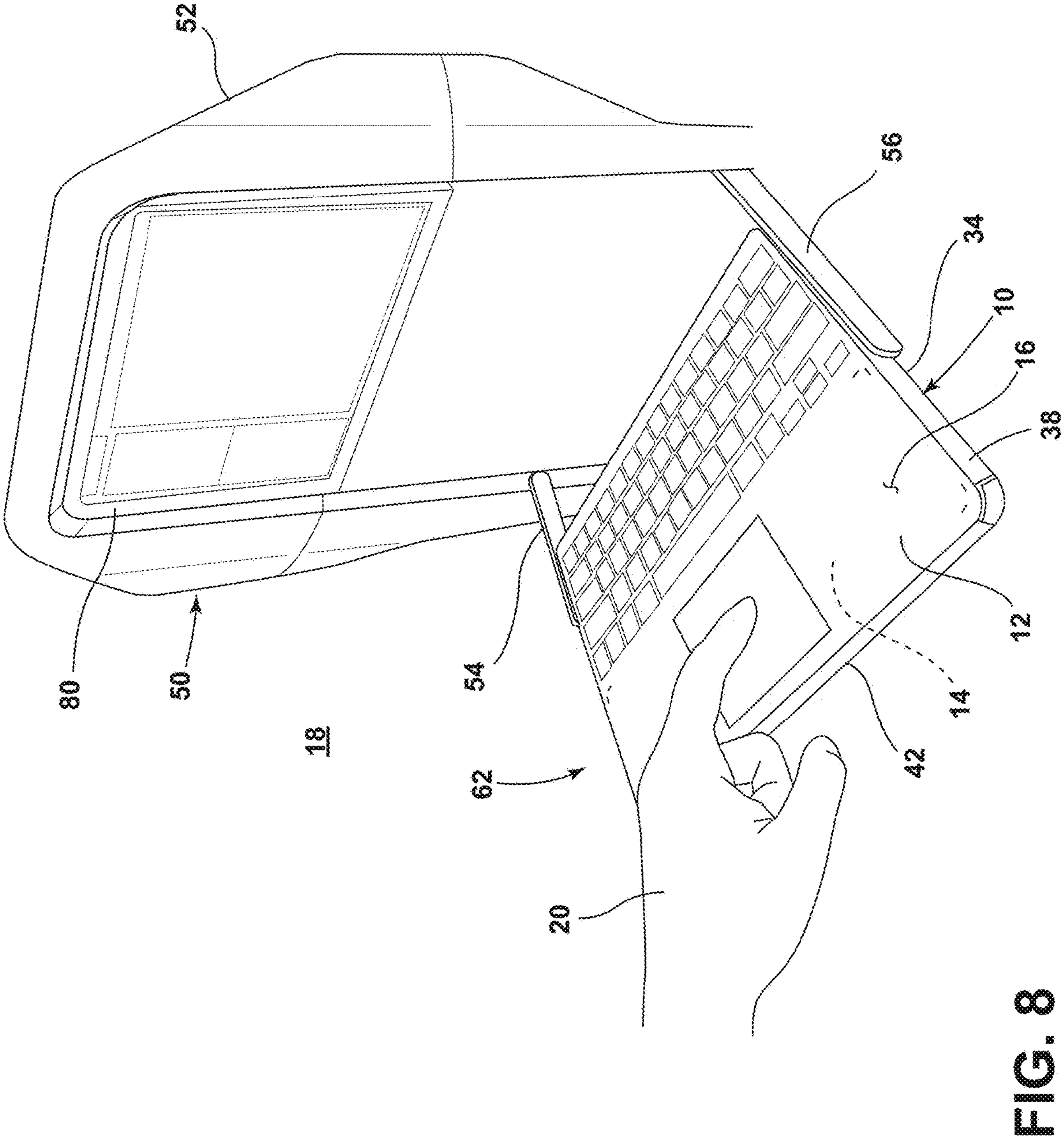
FIG. 8 is another side perspective view of the airline seat and the tray of FIG. 1, illustrating the airline seat further including an integrated display in addition to the tray with the first display, and the first display displaying a virtual keyboard for the passenger to use to manipulate the output of the integrated display.
Figure 9:
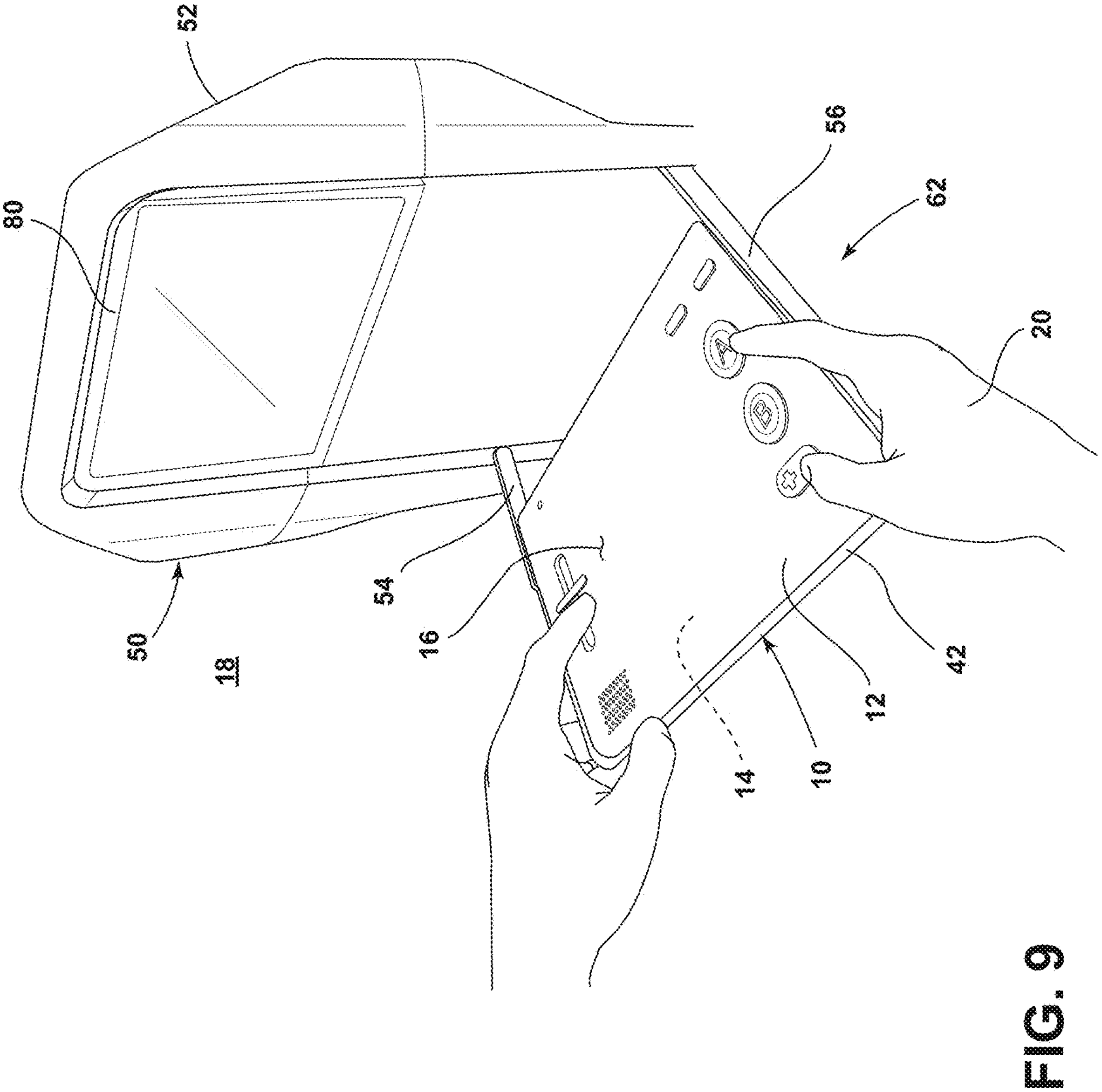
FIG. 9 is the same view as FIG. 8, but this time illustrating the first display displaying a virtual game controller for the passenger to use to manipulate the output of the integrated display (e.g., to play a game viewed on the integrated display)

Referring now to FIGS. 8 and 9, the seat 50 can include an integrated display 80 as well as the tray 10. While the tray 10 can provide the only display (e.g., the first display 14) associated the seat 50, that need not be the case. The integrated display 80 can be disposed elevationally above the tray 10, when the tray 10 is in the stowed position 60. When the tray 10 is in the deployed position 62, the first display 14 can display a keyboard as in FIG. 8 that the passenger 22 can use to control the integrated display 80. As another example, the first display 14 can display a gaming controller as in FIG. 9 that the passenger 22 can use to control the game displayed on the integrated display 80.

Figure 10:
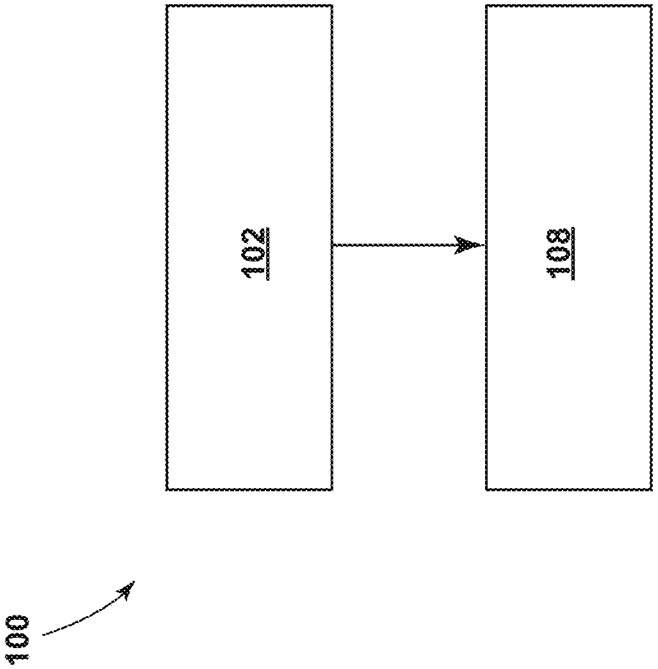
FIG. 10 is a flow chart of a method of using the tray of FIG. 1.

Referring back to FIG. 1 and additionally to FIG. 10, a method 100 of using the tray 10 is herein described. At a step 102, the method 100 includes, in a passenger vehicle 104 (e.g., an airliner or any other passenger transport vehicle), causing the second display 26 to display a seat number 106 of a seat 50 rearward of the seatback 52 to which the tray 10 is coupled in the stowed position 60. That will help the passenger 22 locate the seat 50 assigned to the passenger 22. At a step 108, the method 100 includes, causing the second display 26 to display a name 110 of the intended passenger 22 of the seat 50 rearward of the seatback 52 to which the tray 10 is attached in the stowed position 60. That will further help the passenger 22 to locate the assigned seat 50. Steps 102 and 108 can occur simultaneously, and step 108 can occur before step 102.

The tray 10 and method 100 of the present disclosure address the aforementioned problem, among other ways, because the tray 10 presents the first display 14 and the second display 26 yet is easily removable from the seat 50 due to its modular nature. The tray 10 need only be removed from the first arm bracket 54 and the second arm bracket 56. The fabric covering the seat 50 need not be disrupted to remove the tray 10. The cost to replace or upgrade the tray 10 with the first display 14 and the second display 26 is thus less expensive.

Although the tray 10 and the seat 50 have been illustrated in the context of the passenger vehicle 104 being an airliner, the tray 10 and the seat 50 can be utilized in any passenger vehicle (e.g., a train railcar, a boat, a bus, and so on).

According to a first aspect of the present disclosure, a tray for a passenger seat comprises: (a) a first article that is at least partially transparent to a wavelength or wavelength range within the visible spectrum of electromagnetic radiation comprising a first primary surface; and (b) a first display separated from an external environment by the first article, the first display, when activated, at least partially visible through the first article from the external environment.

According to a second aspect of the present disclosure, the tray of the first aspect further comprises: (a) a second article that is at least partially transparent to a wavelength or wavelength range within the visible spectrum of electromagnetic radiation comprising a second primary surface; and (b) a second display separated from an external environment by the second article, the second display, when activated, at least partially visible through the second article from the external environment, wherein, the first article and the second article sandwich the first display and the second display, and the first display is disposed closer to the first article than the second article.

According to a third aspect of the present disclosure, the tray of any one of the first through second aspects further comprises: a first capacitive touchscreen conductive layer disposed between the first display and the first article.

According to a fourth aspect of the present disclosure, the tray of any one of the first through third aspects further comprises: a first edge and a second edge defining at least part of a perimeter of the tray, the first edge and the second edge facing in opposite directions, wherein, the first article and the first display terminate proximate the first edge and the second edge.

According to a fifth aspect of the present disclosure, the tray of the fourth aspect further comprises: a third edge and a fourth edge, both orthogonal to the first edge and the second edge, the third edge and the fourth edge facing in opposite directions, wherein, the first article and the display terminate proximate the third edge and the fourth edge.

According to a sixth aspect of the present disclosure, the tray of any one of the first through fifth aspects is presented, wherein the first article comprises a recess configured to surround a bottom of a cup when the tray is a deployed position.

According to a seventh aspect of the present disclosure, the tray of any one of the first through sixth aspects further comprises an aperture through the first article and the first display sized to secure a cup when the tray is in a deployed position.

According to an eighth aspect of the present disclosure, the tray of any one of the first through seventh aspects further comprises an inductive coil disposed on the other side of the first display as the first article, the inductive coil configured to charge an electronic device disposed upon or above the first primary surface of the first article.

According to a ninth aspect of the present disclosure, a seat of a passenger vehicle comprises: (a) a seatback; and (b) a tray coupled to the seatback, the tray comprising: (i) a first article that is at least partially transparent to a wavelength or wavelength range within the visible spectrum of electromagnetic radiation comprising a first primary surface; and (ii) a first display separated from an external environment by the first article, the first display, when activated, at least partially visible through the first article from the external environment.

According to a tenth aspect of the present disclosure, the seat of the ninth aspect further comprises a first arm bracket and a second arm bracket, each coupled to both the seatback and tray.

According to an eleventh aspect of the present disclosure, the seat of the tenth aspect is presented, wherein the tray is disposed between first arm bracket and the second arm bracket.

According to a twelfth aspect of the present disclosure, the seat of any one of the tenth through the eleventh aspects further comprises one or more electrical wires in electrical communication with the first display extending from the seatback, along or through at least one of the first arm bracket and the second arm bracket, and into the tray.

According to a thirteenth aspect of the present disclosure, the seat of any one of the ninth through the twelfth aspect further comprises: (a) a stowed position where the first primary surface of the first article of the tray faces the seatback, and (b) a deployed position where the first primary surface of the first article is substantially horizontal, wherein, the tray is configured to move to, from, and between the stowed position and the deployed position.

According to a fourteenth aspect of the present disclosure, the seat of the thirteenth aspect is presented, wherein in the stowed position, the tray is substantially flush with the seatback.

According to a fifteenth aspect of the present disclosure, the seat of any one of the thirteenth through fourteenth aspects is presented, wherein in the stowed position, the tray is positionable elevationally.

According to a sixteenth aspect of the present disclosure, the seat of the thirteenth aspect further comprises: (a) a controller; and (b) a sensor in communication with the controller, the sensor configured to generate output from which the controller can determine whether the tray is in the stowed position or in the deployed position.

According to a seventeenth aspect of the present disclosure, the seat of the sixteenth aspect is presented, wherein (i) the controller is in further communication with the first display and the second display, (ii) the controller deactivates the first display and activates the second display when the controller determines, as a function of a signal received from the sensor, that the tray is in the stowed position or not in the deployed position, and (iii) the controller activates the first display and deactivates the second display when the controller determines, as a function of a signal received from the sensor, that the tray is in the deployed position or not in the stowed position.

According to an eighteenth aspect of the present disclosure, the seat of any one of the ninth through the seventeenth aspect further comprises: a controller in communication with the first capacitive touchscreen conductive layer and the first display of the tray, the controller configured (i) to detect a presence of an object upon or above the first article and (ii) to cause the first display to display only where an object is not detected to be upon or above the first article.

According to a nineteenth aspect of the present disclosure, a method of using a tray of a seat comprises: in a passenger vehicle, causing a display of a tray, in a stowed position, coupled to a seatback of a seat to display a seat number of a seat rearward of the seatback to which the tray is coupled.

According to a twentieth aspect of the present disclosure, the method of the nineteenth aspect further comprises: causing the display of the tray to display a name of an intended passenger of the seat rearward of the seatback to which the tray is coupled.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A tray for a passenger seat comprising:

a first article that is at least partially transparent to a wavelength or wavelength range within the visible spectrum of electromagnetic radiation comprising a first primary surface;

a first display separated from an external environment by the first article, the first display, when activated, is at least partially visible through the first article from the external environment;

a second article that is at least partially transparent to a wavelength or wavelength range within the visible spectrum of electromagnetic radiation comprising a second primary surface; and a second display separated from an external environment by the second article, the second display, when activated, is at least partially visible through the second article from the external environment, wherein, the first article and the second article sandwich the first display and the second display, and the first display is disposed closer to the first article than the second article.

2. The tray of claim 1 further comprising:

a first capacitive touchscreen conductive layer disposed between the first display and the first article.

3. The tray of claim 1 further comprising:

a first edge and a second edge defining at least part of a perimeter of the tray, the first edge and the second edge facing in opposite directions, wherein, the first article and the first display terminate proximate the first edge and the second edge.

4. The tray of claim 3 further comprising:
a third edge and a fourth edge, both orthogonal to the first edge and the second edge, the third edge and the fourth edge facing in opposite directions,
wherein, the first article and the first display terminate proximate the third edge and the fourth edge.

5. The tray of claim 1, wherein
the first article comprises a recess configured to surround a bottom of a cup when the tray is in a deployed position.

6. The tray of claim 1 further comprising:
an aperture through the first article and the first display sized to secure a cup when the tray is in a deployed position.

7. The tray of claim 1 further comprising:
an inductive coil disposed on the other side of the first display as the first article, the inductive coil configured to charge an electronic device disposed upon or above the first primary surface of the first article.

8. A seat of a passenger vehicle comprising:
a seatback; and
a tray coupled to the seatback, the tray comprising:
a first article that is at least partially transparent to a wavelength or wavelength range within the visible spectrum of electromagnetic radiation comprising a first primary surface;
a first display separated from an external environment by the first article, the first display, when activated, is at least partially visible through the first article from the external environment;
a second article that is at least partially transparent to a wavelength or wavelength range within the visible spectrum of electromagnetic radiation comprising a second primary surface; and
a second display separated from an external environment by the second article, the second display, when activated, is at least partially visible through the second article from the external environment,
wherein, the first article and the second article sandwich the first display and the second display, and the first display is disposed closer to the first article than the second article.

9. The seat of claim 8 further comprising:
a first arm bracket and a second arm bracket, each coupled to both the seatback and tray.

10. The seat of claim 9, wherein
the tray is disposed between the first arm bracket and the second arm bracket.

11. The seat of claim 9 further comprising:
one or more electrical wires in electrical communication with the first display extending from the seatback, along or through at least one of the first arm bracket and the second arm bracket, and into the tray.

12. The seat of claim 8 further comprising:
a stowed position where the first primary surface of the first article of the tray faces the seatback, and
a deployed position where the first primary surface of the first article is substantially horizontal,
wherein, the tray is configured to move to, from, and between the stowed position and the deployed position.

13. The seat of claim 12, wherein
in the stowed position, the tray is substantially flush with the seatback.

14. The seat of claim 12, wherein
in the stowed position, the tray is positionable elevationally.

15. The seat of claim 12 further comprising:
a controller; and
a sensor in communication with the controller, the sensor configured to generate output from which the controller can determine whether the tray is in the stowed position or in the deployed position.

16. The seat of claim 15, wherein
the controller is in further communication with the first display and the second display,
the controller deactivates the first display and activates the second display when the controller determines, as a function of a signal received from the sensor, that the tray is in the stowed position or not in the deployed position, and
the controller activates the first display and deactivates the second display when the controller determines, as a function of a signal received from the sensor, that the tray is in the deployed position or not in the stowed position.

17. The seat of claim 8 further comprising:
a first capacitive touchscreen conductive layer disposed between the first display and the first article; and
a controller in communication with the first capacitive touchscreen conductive layer and the first display of the tray, the controller configured (i) to detect a presence of an object upon or above the first article and (ii) to cause the first display to display only where an object is not detected to be upon or above the first article.

18. A seat of a passenger vehicle comprising:
a seatback; and
a tray coupled to the seatback, the tray comprising:
a first article that is at least partially transparent to a wavelength or wavelength range within the visible spectrum of electromagnetic radiation comprising a first primary surface;
a first display separated from an external environment by the first article, the first display, when activated, is at least partially visible through the first article from the external environment; and
a first capacitive touchscreen conductive layer disposed between the first display and the first article;
a controller in communication with the first capacitive touchscreen conductive layer and the first display of the tray, the controller configured (i) to detect a presence of an object upon or above the first article and (ii) to cause the first display to display only where an object is not detected to be upon or above the first article.

19. The seat of claim 18, wherein the tray further comprises:
a second article that is at least partially transparent to a wavelength or wavelength range within the visible spectrum of electromagnetic radiation comprising a second primary surface; and
a second display separated from an external environment by the second article, the second display, when activated, is at least partially visible through the second article from the external environment,
wherein, the first article and the second article sandwich the first display and the second display, and the first display is disposed closer to the first article than the second article.

20. The seat of claim 18 further comprising:
a first arm bracket and a second arm bracket, each coupled to both the seatback and tray.

* * * * *